Patented Feb. 10, 1942

2,272,352

UNITED STATES PATENT OFFICE 2,272,352

CASEIN-COLD-PROCESS

Kurt Ripper, New York, N. Y., assignor to American Cyanamid Company, New York, N. Y., a corporation of Maine No Drawing. Application November 12, 1938, Serial No. 240,204. In Austria November 13, 1937

4 Claims. (Cl. 260—6)

This invention relates to a process for the production of artificial masses from a carbamide, a protein and formaldehyde.

Mixed condensation products of a protein, urea and formaldehyde are already known. There has been described the formation of a sol of a mixed colloid from the above-mentioned raw materials in the making of which no other compounds are used. It is also known that plastic masses can be made of albuminous materials, especially casein, urea and formaldehyde with the aid of considerable quantities of ammonia to prevent precipitation by formaldehyde. Both processes have in common the feature that the condensation reaction is carried out by heating.

Furthermore still other processes are known in which a protein, namely casein, is mentioned in physical admixture with urea formaldehyde reaction products, wherein, however, mixed condensation products are not shown. In this case the protein has been described and acts only as filler or carrier and it is not possible to regulate the reaction of the protein with formaldehyde. Moreover, in this process the urea formaldehyde condensation is carried out by heating.

I have now found that sols of mixed colloids of an albuminous material, urea and formaldehyde can be formed in a simple and easily regulated reaction if the action of formaldehyde on the protein and the carbamide is allowed to take place at room temperature—that is at 15–25° C. —advantageously without any addition of heat. The products obtained have especially valuable characteristics and considerably increased possibilities of commercial utilization. If the components are allowed to react without heating, for a sufficiently long time, products of most diverse utility are obtained after a reaction period of about 40–70 hours. The time of action depends, other conditions being equal, on the choice of the hydrogen ion concentration, the concentration, as well as the exact room temperature.

In the present case the action of formaldehyde on the two other reaction components is practically finished so that the subsequent heat treatment with or without application of pressure primarily only serves the polymerization. If thiourea alone or in admixture with urea is used as the carbamide, liquefaction with sol formation takes place without heating after the specified reaction time. In the case where urea is used alone, a pasty mass is formed after this time which also shows liquefaction on heating to 50–60° C. The transitions between the behavior of the reaction mixture with urea alone and with thiourea alone are gradual so that a sharp border line cannot be given. Comparative tests under otherwise equal conditions— concentration, kind and quantity of protein, hydrogen ion concentration, formaldehyde quantity and temperature—have shown that on the addition of 0.3 mol of thiourea to 1 mol urea, transition phenomena set in. On the addition of 0.5 mol of thiourea to 1 mol urea, liquefaction sets in quite readily without heating. On further increase of the thiourea proportion, this liquefaction sets in even sooner, and the reaction mixtures thus obtained become increasingly thin liquids corresponding to the increase and the quantity of thiourea.

The products which can be made from these sols probably owe at least some of their desirable characteristics to the fact that by avoiding any increase in temperature during the action of formaldehyde, the formation of long fibrous micelles is most favored. Moreover, in the case of the urea-formaldehyde reaction, the formation of the undesirable hydrophil gels is avoided at the same time, so that no obstacles stand in the way of dehydration. Thanks to their colloid-physical characteristics, the liquefied reaction products may not only be most easily processed, but in spite of the presence of the protein component they show no lesser affinity for the cellulose fiber than is the case with the pure amino plastic condensation products. When mixed with cellulose fibers of all kinds and processed in a suitable manner, these sols yield movable masses which may be pressed to completely homogeneous, highly transparent molded bodies. The affinity for textile fibers also seems to produce the most varied results, such as improvement in feel, crease-resistance, etc., if the artificial masses here described are allowed to be formed in fine distribution throughout the fiber or the fabric. Furthermore, the sols may be used for impregnation of all kinds, glues, and adhesives, especially for veneering, etc., as well as for coatings and as lacquer bases.

The molding powder technique is especially improved by the sols thus obtained. It is known that the development of amino plastics is concerned with the problem of avoiding the formation of cracks and fissures which normally occur in two ways: (1) The phenomenon of cracking observed in the beginning of the development appeared soon after the making of the molded products and was considered to be due to incomplete or uneven dehydration. This disadvantage has been eliminated substantially completely by the modern processing methods for the amino plastic condensation products. (2) Another type of cracking sets in after consideration changes in humidity. Even those amino plastic condensation products made according to the best-known processes may still have the tendency to show cracking on considerable changes of humidity and temperature, even after most meticulous dehydration during their production. This danger is greatest if dryness at high temperatures follows high humidity, also at high temperatures. In spite of the otherwise good characteristics of the present amino plastic products, this deficiency places some limitation of their general usefulness. This deficiency shows up less in the case of very thin-walled molded objects, especially if care is taken to avoid flow lines. If, however, thick-walled molded pieces are required as, for example, in the case of telephone receivers, the use of amino plastics is generally impractical in cases where considerable changes of the humidity and temperature have to be reckoned with.

It has now been shown unexpectedly that the sols described herein can be worked up to molded masses which are distinguished by the ease of their manufacture and molding, as well as other outstanding characteristics. The absolute values of water absorption are equal to the best values for the analogous condensation products without protein as raw material, but the above-mentioned danger of cracking has disappeared, even under the most unfavorable conditions which are practically encountered. As an example, objects which were molded from such molding materials, purposely promoting the formation of flow lines, withstood the following stringent test: The objects were held in boiling water for one half hour and were thereafter placed in drying ovens at 60–70° C., whereby the relative humidity of the air was less than 10%. Even after remaining in the drying ovens for several hours, no cracks or fissures were formed.

*Example 1*

20 parts by weight of ground rennet casein are introduced into a solution of 60 parts by weight of urea in 60 parts by weight of water. After a few minutes the casein has so strongly swollen in the urea solution that the total mass has assumed the consistency of paste. To this swollen mass there are added with stirring 117 parts by weight of 36.4% formaldehyde solution to which there has been added such a quantity of inorganic or organic alkaline reacting substances that the total reaction mixture is brought to a hydrogen ion concentration near the neutrality point. The pH value of the mixture may vary between pH 7 and pH 6.

If it is desired to use alkaline agents to speed up the solution of the casein, the pH value may also be adjusted to one greater than pH 7. For the reaction described here and in the following examples, the hydrogen ion concentration is constantly held on the weakly acid side, corresponding to a pH value of less than 7.

The reaction mixture is now allowed to stand at room temperature. As the formaldehyde is being bound, a point is reached from which time on the mixture becomes thicker and thicker until finally it is converted to a white paste. The beginning of the solidification of the reaction mass, however, does not coincide with the end point of the new reaction. For if at this point, at a room temperature of 15–18° C. after about 24 hours, a sample is warmed to 50° C., there are visible swollen casein particles. If the mixture remains beyond this point at room temperature, a sample after about 40–70 hours reaction time shows the phenomenon of being liquefied in a water bath of 50° C. to a viscous but quite homogeneous-appearing mass capable of forming drops.

For many uses, especially impregnation, the reaction is finished and the reaction mixture can be put to use with or without addition of compounds reacting acid under the conditions of use.

For the use as raw material for molded masses the reaction mixture is liquefied at 50–60° C. If the reaction was carried out on the weakly acid side as mentioned above, a further addition is obviated. If, however, the reaction was carried out without heating and under neutral or alkaline conditions, the liquefied reaction mixture is made slightly acid by the addition of small quantities of an acid-reacting substance, preferably a weak organic acid. After thorough kneading in of 60 parts by weight cotton linters or cellulose, the mass is dried by heat. The water is given off with extraordinary ease.

The dried mass is worked up in known manner to molding powders. These are excellently molded in the very shortest time; for instance, objects of 1½–2 mm. wall thickness molded in one minute at 150–160° C. The absolute quantities of water absorbed, measured on these molded bodies, are analogous to those which are produced from condensation products without protein, but the danger of cracking has disappeared, even under most stringent conditions.

*Example 2*

30 parts by weight of urea and 30 parts by weight of thiourea are dissolved in 120 parts by weight of water. After the addition of 20 parts by weight of rennet casein and 112 parts by weight of 36.4% formaldehyde solution and adjustment of the hydrogen ion concentration, there is obtained a reaction mixture which in the beginning looks similar to the preparation of Example 1. In this case, however, liquefaction sets in in the cold in contrast to the preceding example. After about 40–60 hours there is produced a completely homogeneous slightly cloudy liquid, the viscosity of which is considerably lower, even without heat, than the liquefied reaction mixture according to Example 1. If worked up in an analogous manner, moldable masses containing cellulose are obtained which can be readily pressed and yield molded objects of excellent mechanical and chemical resistance which also show the surprising characteristic that they do not form cracks or fissures, even after remaining in boiling water for one half hour and subsequently in drying ovens of 60–70° C. at a relative humidity of 10%.

This stringent and short test shows the resistance of the amino plastic products made according to the new process against strong changes in temperature and humidity.

As a consequence of the elimination of the danger of cracking, another very important advantage has shown itself. It is known that the amino plastics made by known processes show attacks when treated with colored liquids, especially coffee and tea, which predominantly appear along the fine hair-like fissures which are formed after some use. The elimination of these fissures also eliminates the cause of the discolorations.

The masses described in the preceding two examples can be worked up to molding masses without filler and these give molded pieces with very good chemical resistance.

*Example 3*

Instead of the rennet casein utilized in Example 1, there may also be used acid casein. In order to work at the same hydrogen ion concentration as in that example, the alkaline-reacting additions necessary for adjustment are, of course, varied, depending on the characteristics of the acid casein. Otherwise the reaction proceeds analogously to that with rennet casein.

*Example 4*

In analogous manner to that described above, the rennet casein of Example 2 may be substituted by acid casein.

*Example 5*

60 parts by weight of thiourea are dissolved in 120 parts by weight of water and 20 parts by weight of rennet casein are added thereto. After short swelling, there are added 112 parts by weight of 36.4% formaldehyde solution which is so adjusted that the reaction mixture after peptisation of the protein component shows a pH value of 6.0. After a reaction period of about 45 hours at 18° C. room temperature, there is formed a water-thin sol which, mixed with cotton linters, can be worked up to moldable masses.

*Example 6*

The reaction product obtained in the cold according to Example 2 can be used for manifold purposes of textile improvement.

If a stiffening effect is to be obtained, the solution can be used for impregnation immediately after the sol formation.

Especially unexpected, however, is the possibility that these condensation products, in spite of the component derived from protein, can be utilized for the purposes of obtaining creaseproofing. The sols may be readily diluted to several times their volume, in which case the solutions, with or without accelerators, can be used for the treatment of textiles. The hardening can be carried out extraordinarily quickly by passing over hot rolls, whereby the artificial material thus produced in fine subdivision gives a considerably better feed than according to the usual processes and, moreover, very good laundering resistance is obtained.

*Example 7*

A reaction product obtained according to Example 1 is mixed with an acid reacting accelerator after liquefaction and, for gluing of ply-wood or veneer, is then applied by means of brushes or rolls to the sheets to be united. Thanks to the high viscosity of the product, only very little of the material is required. Yet a very good adhesion is obtained, together with high moisture resistance, after the sheets are united by heat and pressure. In a similar manner all the sols obtainable according to the described processes may be utilized for the purposes of gluing, uniting, etc., whereby if it is necessary, the protein component may be increased.

Instead of milk casein, there may also be used proteins of other animal origin, as for instance blood albumen, etc., or proteins of vegetable origin, such as zein, the protein of corn, or the so-called soya casein, the protein of the soya bean. In the latter case, it is necessary that the urease be removed or rendered innocuous.

Of course, the quantities given in the examples are not restricted either as to the absolute or relative amount of the individual components. Furthermore, several proteins can be utilized together. Also, instead of urea or thiourea there may be used their derivatives or conversion products, all of which are to be understood by the term "urea" or "thiourea" respectively. Instead of formaldehyde there may also be used its polymers. Furthermore, additions of all kinds may be made, such as especially alkyd resins and condensation products of phenols and aldehydes. Other changes may be made without departing from the spirit and scope of the invention except as defined in the claims.

I claim:

1. The process which comprises mixing in aqueous solution casein and a carbamide selected from the group consisting of urea, thiourea, and mixtures of the same, allowing the mixture to stand for a short time until the protein becomes swollen and the mixture has assumed the consistency of paste, adding formaldehyde to such paste and allowing the mix thus produced to react at substantially room temperatures for a period of at least about 40 hours until the reaction product is liquefiable at temperatures not about about 50° C., the reaction being maintained weakly acid substantially throughout.

2. The process of claim 1 in which the reaction period is between about 40–70 hours.

3. The process of claim 1 in which the reaction takes place in the range pH 6–7.

4. A homogeneous mass capable of forming drops and showing substantially no visible swollen protein particles, said mass having been produced by the process of claim 1.

KURT RIPPER.